United States Patent
Lennartsson (10) Patent No.: US 11,731,820 B2
(45) Date of Patent: Aug. 22, 2023

(54) PACKAGING MATERIAL AND METHOD FOR PROVIDING A PACKAGING MATERIAL

(71) Applicant: TETRA LAVAL HOLDINGS & FINANCE S.A., Pully (CH)

(72) Inventor: Mattias Lennartsson, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 242 days.

(21) Appl. No.: 17/257,353

(22) PCT Filed: Jul. 5, 2019

(86) PCT No.: PCT/EP2019/068170
§ 371 (c)(1),
(2) Date: Dec. 31, 2020

(87) PCT Pub. No.: WO2020/008065
PCT Pub. Date: Jan. 9, 2020

(65) Prior Publication Data
US 2021/0284409 A1  Sep. 16, 2021

(30) Foreign Application Priority Data
Jul. 6, 2018  (EP) ..................... 18182164

(51) Int. Cl.
*B65D 65/40* (2006.01)
*B65B 9/087* (2012.01)
(Continued)

(52) U.S. Cl.
CPC ............. *B65D 65/40* (2013.01); *B31B 50/14* (2017.08); *B32B 3/02* (2013.01); *B32B 3/266* (2013.01);
(Continued)

(58) Field of Classification Search
CPC ........ B65D 5/4266; B65D 5/54; B65D 65/40; B65B 61/02; B65B 61/06; B65B 61/12;
(Continued)

(56) References Cited

U.S. PATENT DOCUMENTS

2006/0105124 A1  5/2006  Kikuchi
2009/0100803 A1  4/2009  Rasile et al.
(Continued)

FOREIGN PATENT DOCUMENTS

CN  107206730 A  9/2017
DE  19549740.6 B4  3/2006
(Continued)

OTHER PUBLICATIONS

Anonymous., "Liquid packaging board—Wikipedia,", (Jan. 27, 2017), Retrieved from the Internet, URL:https://web.archive.org/web/20170708172416/https://en.wikipedia.org/wiki/Liquid_packaging_board [retrieved on Sep. 3, 2020]. (2 pages).
(Continued)

*Primary Examiner* — Yan Lan
(74) *Attorney, Agent, or Firm* — Buchanan Ingersoll & Rooney PC (57) ABSTRACT

A packaging material having a core layer and inside and outside laminate portions is provided. The packaging material comprises a first area to form a first package, and a second area to form a second and adjacent package. The first area and the second area have a transversal sealing area between them, and the core layer is provided with at least one weakening portion at the transversal sealing area.

17 Claims, 6 Drawing Sheets

(51) Int. Cl.
  *B65B 61/06* (2006.01)
  *B65B 61/02* (2006.01)
  *B31B 50/14* (2017.01)
  *B32B 3/02* (2006.01)
  *B32B 3/26* (2006.01)
  *B32B 38/10* (2006.01)
  *B65D 5/54* (2006.01)
  *B32B 38/04* (2006.01)
  *B32B 27/10* (2006.01)
  *B32B 37/06* (2006.01)

(52) U.S. Cl.
  CPC .............. *B32B 27/10* (2013.01); *B32B 37/06* (2013.01); *B32B 38/04* (2013.01); *B32B 38/10* (2013.01); *B65B 9/087* (2013.01); *B65B 61/02* (2013.01); *B65B 61/06* (2013.01); *B65D 5/54* (2013.01); *B32B 2307/31* (2013.01); *B32B 2439/00* (2013.01)

(58) Field of Classification Search
  CPC .............. B65B 9/087; B32B 2038/042; B32B 2307/31; B32B 2439/00; B32B 2439/62; B32B 2439/70; B32B 27/10; B32B 3/02; B32B 3/26; B32B 3/266; B32B 33/00; B32B 37/06; B32B 38/04; B32B 38/10; B29C 65/3656; B29C 66/4322; B29C 66/4312; B29C 66/71; B29C 66/8491; B29C 66/81427; B29C 66/1122; B26F 1/00; B26F 1/18; B31B 50/14
  See application file for complete search history.

(56) References Cited

U.S. PATENT DOCUMENTS

| | | | |
|---|---|---|---|
| 2012/0103856 A1 | 5/2012 | Toft et al. | |
| 2016/0059973 A1 | 3/2016 | Lennartsson et al. | |
| 2016/0107812 A1 | 4/2016 | Exner et al. | |
| 2016/0304230 A1 | 10/2016 | Tyner et al. | |
| 2018/0105354 A1 | 4/2018 | Björk et al. | |
| 2019/0321919 A1 | 10/2019 | Cappel et al. | |

FOREIGN PATENT DOCUMENTS

| | | | |
|---|---|---|---|
| DE | 102007025786 A1 | 12/2008 | |
| EP | 2978673 A1 | 2/2016 | |
| JP | H09-123085 A | 5/1997 | |
| JP | 2004-075136 A | 3/2004 | |
| JP | 2004-098648 A | 4/2004 | |
| JP | 2012-532044 A | 12/2012 | |
| JP | 3192781 U | 9/2014 | |
| JP | 2020-500787 A | 1/2020 | |
| WO | 2014154623 A1 | 10/2014 | |

OTHER PUBLICATIONS

Office Action (Communication pursuant to Article 94(3) EPC) dated Sep. 9, 2020, by the European Patent Office in corresponding European Patent Application No. 19 184 803.5-1014. (5 pages).

First Search dated Aug. 26, 2022, by the State Intellectual Property Office of People's Republic of China in corresponding Chinese Patent Application No. 201980045069.7. (2 pages).

International Search Report (PCT/ISA/210) with translation and Written Opinion (PCT/ISA/237) dated Oct. 1, 2019, by the European Patent Office as the International Searching Authority for International Application No. PCT/EP2019/068170.

Extended European Search Report for EP 18182164.6 dated May 15, 2019.

Extended European Search Report for EP 19184803.5 dated Oct. 31, 2019.

Partial European Search Report for EP 18182164.6 dated Jan. 18, 2019.

Office Action (Notice of Reasons for Refusal) dated Jun. 6, 2023, by the Japan Patent Office in corresponding Japanese Patent Application No. 2021-522142 and an English translation of the Office Action. (10 pages).

PACKAGING MATERIAL AND METHOD FOR PROVIDING A PACKAGING MATERIAL

TECHNICAL FIELD

The invention relates to a packaging material, and in particular to a packaging material being suitable for forming individual packages for storing liquid food products.

BACKGROUND ART

Packages for storing liquid food products exist on the market, and filling machines allow such food packages to be produced at a very high speed. According to one well-established principle a continuous sequence of packages are manufactured by forming a running web of packaging material into a tube by sealing the longitudinal ends of the web to each other. As the tube is filled with the liquid content to be stored by the packages, transversal sealing is performed below the level of the filled liquid food. In a single sealing action two transversal seals are actually created simultaneously; an upper end seal for a leading package, and a lower end seal for an immediately trailing package. When the sealing action is done, a knife is actuated to cut the tube transversally in the area between the upper end seal and the lower end seal, thus separating the leading (and now sealed) package from the upstream tube. The upper end seal may form the top seal of the resulting package, while the lower end seal forms the bottom of the package. Alternatively, the upper seal may form the bottom of a package, and vice versa.

The lower end seal is arranged at a specific longitudinal distance from the upper end seal. As the filled tube will be transversally clamped during the sealing action, liquid product may fill the space at the distance between the upper and lower end seals thus forming a closed, transversal, cushion-like structure through which the knife must cut. During cutting, such a cushion-like structure will act against the action of the knife. In the heat-sealing and subsequent cutting operations, the filled cushion-like structure may give rise to minor imperfections in the transversal fold, that may require more energy and heat to be applied to the folded material at sealing. As there is constant strive for simplified operation and reduced energy consumption there is a need for an improved sealing operation, and in particular for a packaging material allowing for an improved cutting during such sealing operation.

SUMMARY

It is an object of the invention to at least partly overcome one or more of the above-identified limitations of the prior art. In particular, it is an object to provide a packaging material which allows for improved separation of sealed packages from an upstream tube of packaging material.

To solve these objects a web of packaging material is provided, comprising a core layer and an inside laminate portion to be directed towards the inside of a package formed from the packaging material and comprising a layer of a heat sealable thermoplastic polymer, the web comprising a first area to form a first package, and a second area to form a second and adjacent package, and a transversal sealing area extending in the transversal direction across the width of the web, located between the first area and the second area, wherein the transversal sealing area comprises an upper transversal sealing area for accommodating an upper end seal of the first package, a lower transversal sealing area for accommodating a lower end seal of the second package, and a transversal cutting area arranged between the upper and lower transversal sealing areas, for accommodating a linear transversal cut along the center of the entire extension of the transversal cutting area when cutting off individual packages formed from the web of packaging material, and wherein the core layer is provided with at least one weakening portion at the transversal sealing area.

The core layer may comprise a cellulose-based material such as paper or paperboard.

The at least one weakening portion may comprise at least one cut-through of the core layer. Alternatively, it may comprise a plurality of cut-throughs of the core layer. The weakening portion is additional to any optional weakening for the linear transversal cut. Thus, the weakening is not a weakening for the linear transversal cut to be made in a later operation when individual packages are cut off from the continuously formed tube of packaging material.

Normally, a heat sealable thermoplastic layer forms the innermost layer of a laminated packaging material, i.e. the layer which is to be in contact with the filled product in the package.

The at least one weakening portion may be arranged at a lateral position of the transversal sealing area, at which position the packaging material is intended to be folded. It may thus be arranged at the transversal cutting area, the transversal cutting area being arranged between an upper and a lower transversal sealing area. In an embodiment, it may be fully arranged within the transversal cutting area.

It may extend in the longitudinal direction, in a different direction to the transversal direction of the width of the web, such as substantially in the longitudinal direction of the web, i.e. substantially perpendicular to the transversal cutting area. The length of the at least one weakening portion may be more than 50% of the length of the cutting area.

The core layer may be provided with a plurality of weakening portions at the transversal sealing area.

The core layer may be further laminated to an outside laminate portion, on the opposite side of the core layer, i.e. opposite to the inside laminate portion.

According to a second aspect, a package is provided, formed by the packaging material of the invention.

The package may comprise a transversal lower end seal and a transversal top end seal, at least one of the end seals being formed by transversally folding the tube of packaging material and subsequent sealing, the at least one weakening portion being positioned at the area of the fold of the tube.

By the packaging material of the invention, improved transversal sealing, cutting and forming processes are obtained, at lower energy consumption during the filling of packages, as well as improved resulting filled packages, having stronger seals and folds and better final package appearance.

According to a third aspect, a method for providing the packaging material may comprise the steps of providing a core layer with at least one weakening portion, providing a first area intended to form a first package, and a second area intended to form a second and adjacent package, and a transversal sealing area extending in the transversal direction across the width of the web, located between the first area and the second area, wherein the transversal sealing area comprises an upper transversal sealing area for accommodating an upper end seal of the first package, a lower transversal sealing area for accommodating a lower end seal of the second package, and a transversal cutting area arranged between the upper and lower transversal sealing areas, for accommodating a linear transversal cut along the center of the entire extension of the transversal cutting area when cutting off individual packages formed from the web of packaging material, laminating an inside laminate portion to one side of the core layer, the inside laminate portion comprising a layer of a heat sealable thermoplastic polymer and to be directed towards the inside of a package formed from the packaging material, the at least one weakening portion being positioned at the transversal sealing area.

The method may further comprise the step of providing a first set of crease lines at the first area intended to form a first package, and a second set of crease lines at the second area intended to form a second and adjacent package.

The method may further comprise the step of laminating the core layer to an outside laminate portion to the opposite side of the core layer.

A web of packaging material is normally provided to the packaging and filling station as a reel of wound-up packaging material. The reel is continuously un-wound and fed forward into the packaging machine for the formation of a continuous tube to be filled with liquid contents, sealed and cut off as individual packaging units to be further fold-formed into a final shape and then delivered for further distribution to retailers and consumers.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
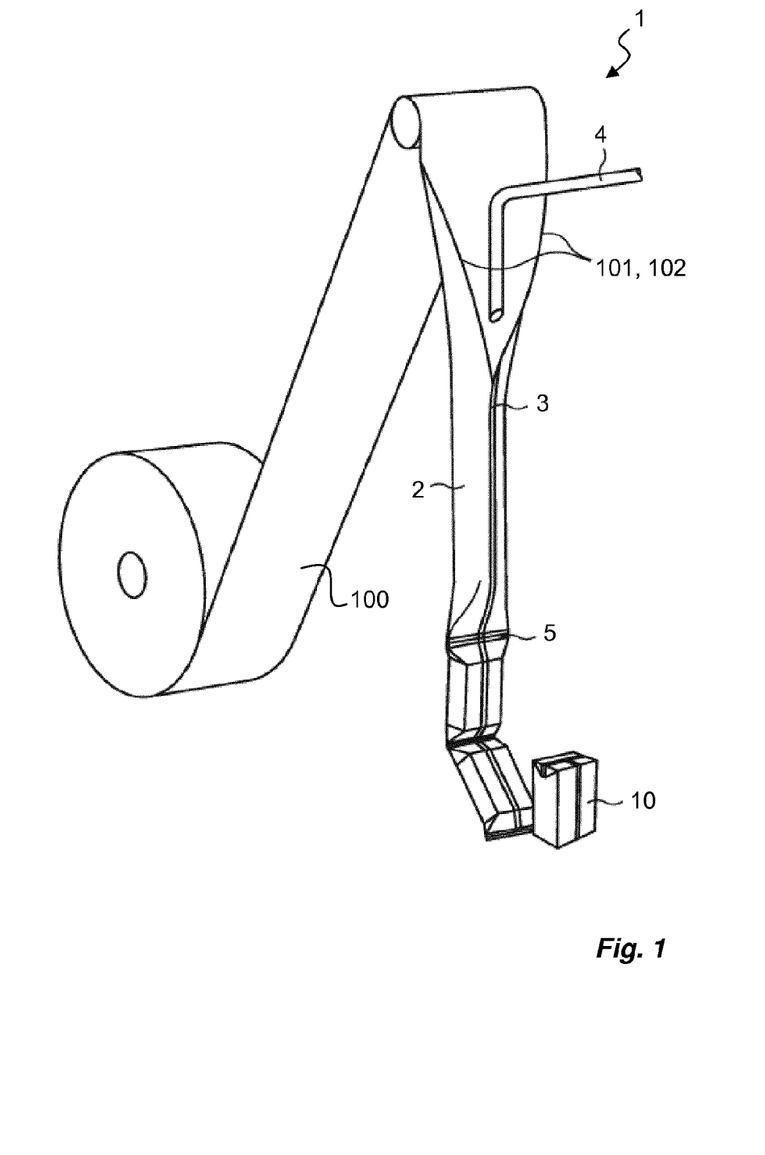
FIG. 1 is an isometric view of parts of a filling machine being configured to provide a series of consecutive liquid food packages from a tube of packaging material.

With reference to FIG. 1 parts of a filling machine 1 is illustrated. The filling machine 1 operates according to the following principle; a web of packaging material 100 is formed into a tube 2 by the longitudinal edges 101, 102 of the packaging material 100 being united to one another in an overlap joint 3. The tube 2 is filled with the intended liquid food product from a filling tube 4 and is divided into individual packages 10 by repeated transversal seals 5 of the tube 2 at a pre-determined distance from one another below the level of the filled contents in the tube 2. The packages 10 are separated by incisions in the transversal seals and are given the desired geometric configuration by fold formation along prepared crease lines in the material.

Figure 2A:
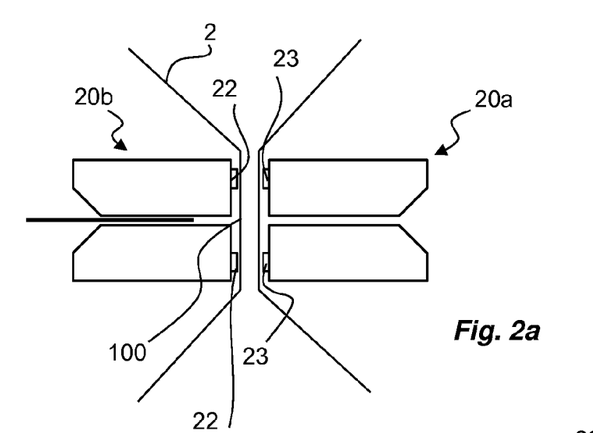
FIGS. 2a-c are cross-sectional views of a sealing device, forming part of the filling machine shown in FIG. 1, during operation to provide a transversal seal to the tube of packaging material and to separate a downstream package from the upstream tube.
Figure 2B:
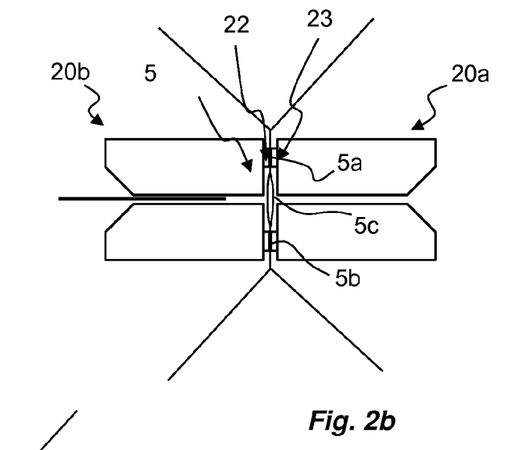
Figure 2C:
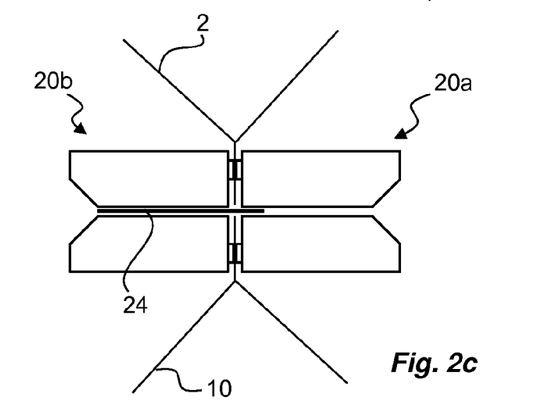

To further explain the advantages of the embodiments presented herein more details of the sealing operation is given in the following. With reference to FIGS. 2a-c the sealing operation is schematically illustrated, i.e. the process performed in order to provide the transversal seal 5 as mentioned above.

The general principle of this sealing action is to press two sides of the tube 2 of packaging material 100 towards each other, and to heat the packaging material 100 locally such that the contacting, inside, thermoplastic layer of the packaging material 100, of the tube walls, are bonded to each other. In a filling machine 1, this is typically performed by reciprocal action of a pair of opposing sealing jaws 20a, 20b. The sealing jaws 20a-b are moveable at least in the horizontal plane, and they have an idle position in which the tube 2 of packaging material 100 fits there between, as indicated in FIG. 2a.

On a first side, the sealing jaw 20b is a pressing jaw, comprising an upper and a lower pressing bar 22, in some cases provided with a ridge, for transversally clamping and squeezing the tube.

On the other, opposite side, the opposite sealing jaw 20a is an anvil jaw, comprising an upper and a lower elastic dolly 23 for receiving and damping the pressure from the bars or ridges, which are thus pressing on the first side of the double folded material of the tube.

Each pressing jaw 20-b comprises an upper and a lower pressing bar 22, each provided with a heating arrangement or heating element. The pressing bars 22 with heating elements may be connected. Heating for the sealing operation may be provided by arrangements for e.g. induction heating, ultrasonic heating, convection heating or impulse heating. Induction heating is a preferred heating technology for laminated materials comprising aluminium foil as a barrier material, while non-foil containing laminated materials may in an embodiment be sealed by ultra-sonic heat generation or other heating arrangements.

In a first operation, as indicated in FIG. 2b, the pair of sealing jaws 20a-b are moved towards each other such that the tube 2 of packaging material 100 is pressed between the pressing bars 22 and the dollies 23 of the respective sealing jaw 20a-b. Upon actuation, the heating circuits will ensure that a transversal seal 5 is formed at the tube 2. Such transversal seal 5 is formed as one upper end seal 5a, and one lower end seal 5b. The upper end seal 5a is spaced apart from the lower end seal 5b by means of a cutting area 5c.

Turning to FIG. 2c, when the transversal seal 5 is provided, a cutting knife 24 is actuated to perform a horizontal cut at the cutting area 5c, through the materials of the folded tube. Upon cutting, a downstream package 10 is separated from the upstream tube 2, which now has a sealed lower end.

As can be seen in FIG. 2b, when the tube 2 is clamped between the sealing jaws 20a-b the cutting area 5c may form a transversal, ribbon-shaped, cushion-like shape. This is due to the fact that the tube 2 is filled with content up to a level vertically above the position of the sealing jaws 20a-b. Hence, when the sealing jaws 20a-b meet there may be liquid product trapped between the positions of the upper end seal and the lower end seal. If thereby a cushion-like shape is formed, the cutting action may be affected negatively.

In order to reduce the possible impact of such entrapment of liquid product in the cutting area 5c between the upper end seal 5a and the lower end seal 5b, and to thereby improve the cutting and heat sealing actions, the packaging material 100 is provided with at least one weakening portion as will be explained in the following.

Figure 3:
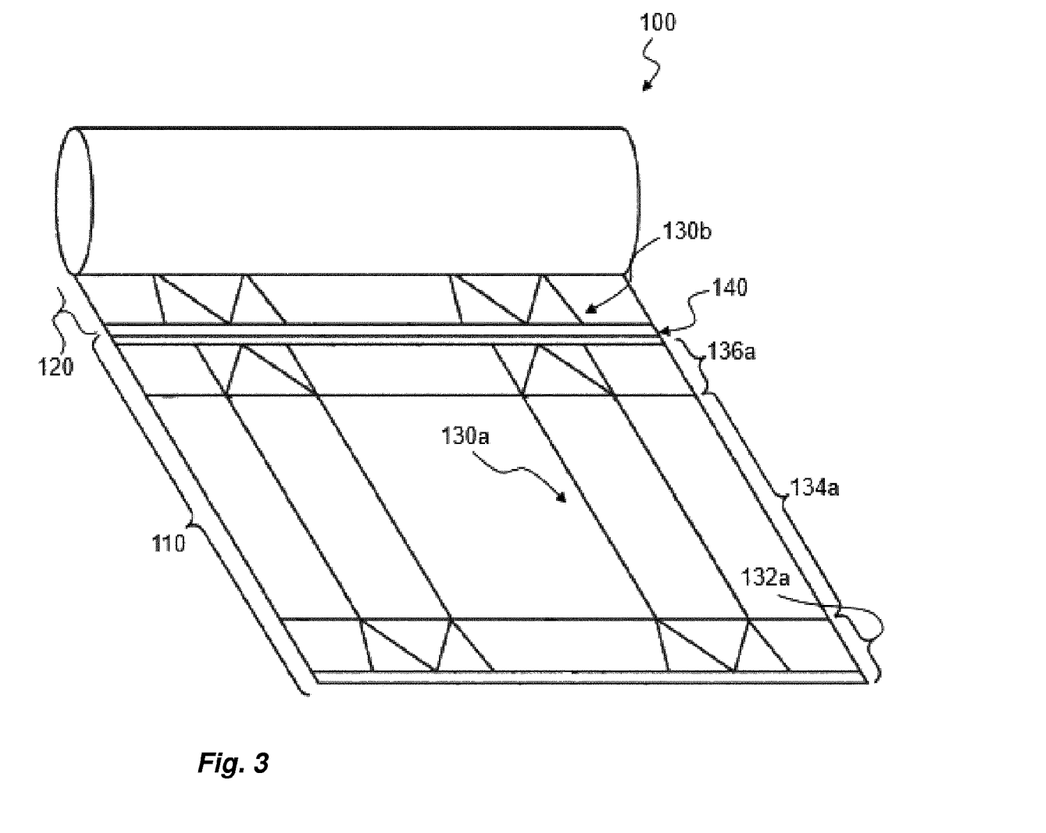
FIG. 3 is an isometric view of a web of packaging material used to form packages.

In FIG. 3 an embodiment of a packaging material 100 is schematically shown. The packaging material 100 is provided as a continuous web, being rolled in order to efficiently fit with the filling machine 1 of FIG. 1.

The width of the packaging material 100 corresponds to what is required to form one single package 10. The web of packaging material 100 comprises a plurality of areas arranged in series; a first area 110 to form a first, or leading package 10, is followed by a second area 120 intended to form a second, or trailing package 10. The second area 120 is, as is readily understood, followed by a third area, a fourth area, etc (not shown).

Each area 110, 120 is provided with crease lines 130a-b. The crease lines 130a of the first area 110 are designed to form the first package 10, while the crease lines 130b of the second area 120 are designed to form the second and adjacent package 10.

Although only shown for the first area 110, the crease lines 130a of one area 110, 120 comprises a first set of crease lines 132a being designed to form a lower bottom end of the package 10, a second set of crease lines 134a being designed to form a main body of the package 10, and a third set of crease lines 136a being designed to form a closed upper end of the package 10.

According to another embodiment, the packaging material may be without crease lines, or only partly provided with crease lines, e.g. by one set of crease lines only.

As is further shown in FIG. 3, the first area 110 is separated from the second area 120 by means of a transversal sealing area 140. This means that the transversal sealing area 140 is positioned in between a third set of crease lines 136a of a leading first area 110 and a first set of crease lines 132a of a trailing, second area 120.

A common feature of all embodiments described herein is that the transversal sealing area 140 is provided with at least one weakening portion. Details of how such weakening portion is configured within the packaging material 100 is further explained below with reference to FIG. 5 and FIGS. 6a-d. However, with initial reference to FIG. 4 the configuration of weakening portions within the transversal sealing area 140 will be described.

Figure 4:
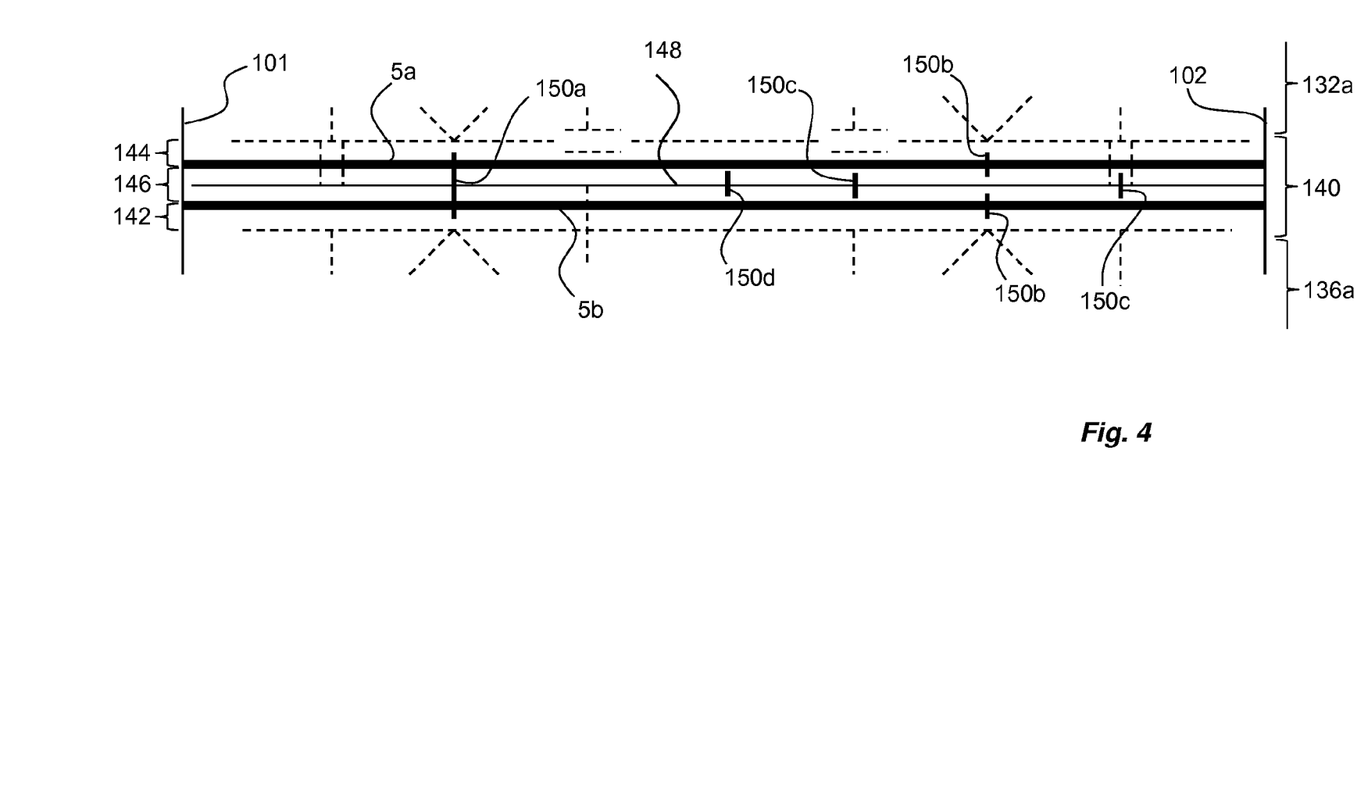
FIG. 4 is an enlarged view of a transversal sealing area of the web of packaging material shown in FIG. 3.

As can be seen in FIG. 4 the transversal sealing area 140 has a longitudinal extension being sufficient to contain both the upper end seal 5a (the future position of which is indicated by the thick line) and the lower end seal 5b (the future position of which also being indicated by a thick line). The later-to-be-formed cutting area 5c of the tube 2 extends between the upper end seal 5a and the lower end seal 5b, as explained above.

For this purpose the transversal sealing area 140 comprises an upper sealing area 142, a lower sealing area 144, and a cutting area 146 arranged between the upper and lower sealing area 142, 144.

At least one weakening portion 150 is provided at the transversal sealing area 140. Different positions of the weakening portion 150 may be considered in order to emphasize different technical effects. For example, a weakening portion 150a may be arranged within the transversal sealing area 140 at a lateral position corresponding to where the tube 2 is folded during sealing, i.e. at a position corresponding to the lateral edge of the tube 2. Such position of the weakening portion 150a has proven to improve folding of the tube 2, thus also improving the forming, integrity and appearance of the final package. The weakening portion 150a is illustrated as extending across the upper sealing area 142, the lower sealing area 144, and the cutting area 146.

Packages are cut off from a tube of the packaging material along a center line of the transversal cutting area 146, i.e. along a transversal linear cut 148.

In another embodiment a weakening portion 150b is positioned at a location corresponding to the opposite lateral edge of the tube 2. This weakening portion 150b is provided as two separate weakening portions, aligned in lateral direction but spaced apart in the longitudinal direction. This means that each weakening portion 150b is arranged at the upper and lower sealing area 142, 144, respectively, but that they do not have any substantial extension within the cutting area 146.

Another example of how a weakening portion 150 can be positioned is illustrated by the weakening portions 150c; these are located at positions corresponding to complex folding zones of the laminated packaging material of the final package 10. As can be seen, the entire weakening portion 150c extends within the cutting area 146 but it does not extend to the upper or lower sealing area 142, 144. The weakening portions 150c help relieve stress in the material layers in areas of complex folding. Similar weakening portions 150d may alternatively, or also, be applied at a random lateral position of the transversal sealing area 140.

A yet further example is illustrated by the weakening portion 150d; this is located at an arbitrary position along the tube 2.

As is understood the weakening portion can be positioned at various locations along the transversal sealing area 140, both in lateral direction and in longitudinal direction. As the weakening portion 150 reduces the robustness of the packaging material 100, less force will be required during the cutting action when the cutting knife 24 is penetrating the packaging material 100 at the cushion-like structure. Also, thanks to improved folding, less heat energy will be required for the heat sealing operation.

A weakening portion 150 is provided as a local reduction of robustness of the packaging material 100. An example of a packaging material 100 is shown in cross-section in FIG. 5.

Figure 5:
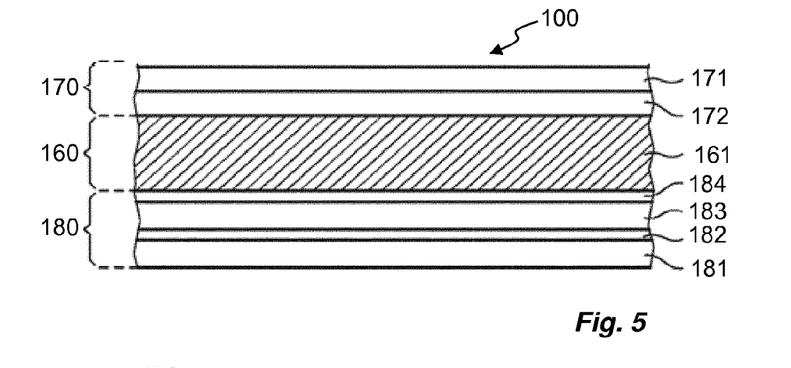
FIG. 5 is a cross-sectional view of a packaging material.

The packaging material 100 is a laminated packaging material. It is in principle a laminate composed from three laminate portions of material layers. The interior laminate portion 160 is a core center layer 161 of a bulk material of a paper, paperboard or other cellulose-based material, such as so-called duplex or triplex type paperboard, or liquid packaging paperboards. The core layer is the main contributor to the bending stiffness and bulk properties of a laminated packaging material and to the dimensional stability of packages made therefrom. The outside laminate portion 170 comprises an outermost liquid-tight and transparent layer 171 of a plastic, preferably a heat sealable thermoplastic, such as a polyolefin, such as a polyethylene material layer. The lamination operation could alternatively be a melt extrusion lamination operation, applying an intermediate layer of thermoplastic bonding material 172 between the core layer 161 and a transparent pre-manufactured film 171.

The inside laminate portion 180, on the other side, the inside, of the core layer 161, comprises an innermost, heat sealable thermoplastic layer 181, which is also the layer of the packaging material 100 that will be in direct contact with the filled food product in a final packaging container. The innermost, heat sealable polymer layer 181 may be applied as a single layer, or as a multilayer polymer structure 181-184 by e.g. melt co-extrusion on the inside of the core layer 161.

According to a further embodiment, pre-manufactured films or foils, such as aluminium foil, for providing gas barrier properties, may also be laminated to the inside of the core layer 161 by means of melt extrusion lamination of an intermediate bonding layer of thermoplastic material, such as a polyolefin, such as polyethylene, such as LDPE. Such barrier film or foils are thus located between the innermost, heat sealable polymer layer 181 and the core layer 161.

Manufacturing of the packaging material 100 can be made in various ways as are well known within the art. It should further be noticed that different configurations of the packaging material 100 are available, as long as the packaging material 100 comprises a core layer 161.

Within the context of this specification the weakening portion 150 is provided as a local reduction in robustness of the core layer 161. Such reduction in robustness is achieved by reducing the thickness of the core layer 161. It should be noted that a crease line, i.e. a local deformation of the core layer 161, is not considered to represent a weakening portion 150.

Figure 6A:
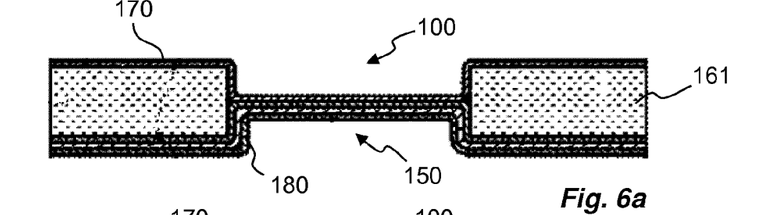
FIGS. 6a-d are cross-sectional views of a packaging material being provided with a weakening portion according to various embodiments.

In FIG. 6a a first example of a weakening portion 150 is schematically illustrated. In this example a portion of the core layer 161 has been fully removed, e.g. by cutting, punching, laser removal, etc. The lateral dimension of the weakening portion 150 is large enough to allow the outside laminate portion 170 to be laminated and adhered to the inside laminate portion 180.

Figure 6B:
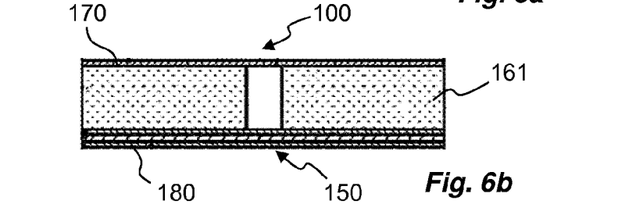

In FIG. 6b another example of a weakening portion 150 is schematically illustrated. Also in this example a portion of the core layer 161 has been fully removed, e.g. by cutting, punching, laser removal, etc. The lateral dimension of the weakening portion 150 is however not large enough to allow the outside laminate portion 170 to be laminated and adhered to the inside laminate portion 180. Instead, the outside laminate portion 170 is separated from the inside laminate portion 170 at the location of the weakening portion 150.

Figure 6C:
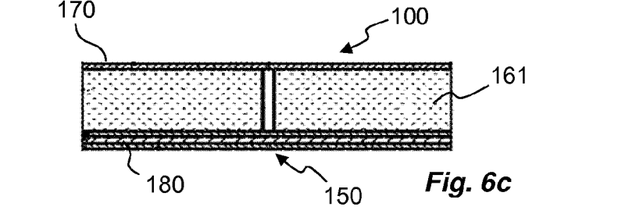

In FIG. 6c a yet further example of a weakening portion 150 is schematically illustrated. In this example a portion of the core layer 161 has been fully cut, however no material is removed. The weakening portion 150 is thus formed by slitting the core layer 161.

Figure 6D:
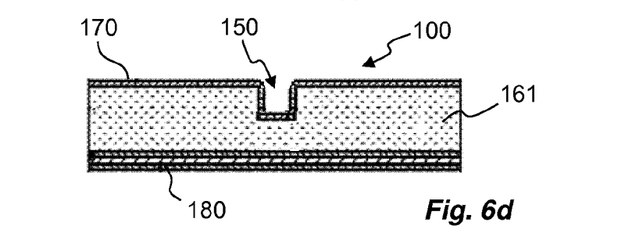

In FIG. 6d another example of a weakening portion 150 is schematically illustrated. In this example only a part of the core layer 161 has been fully removed, e.g. by milling, grinding, laser removal, etc. The thickness of the core layer 161 is thereby locally reduced.

Figure 7:
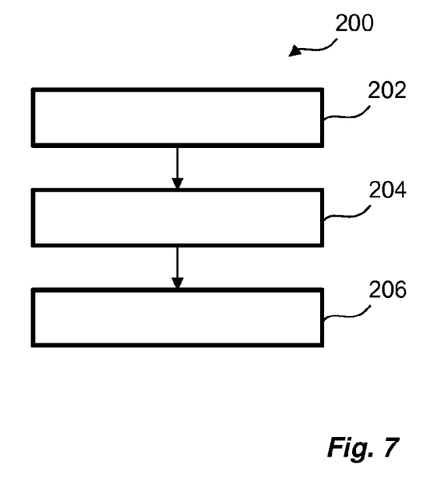
FIG. 7 is a schematic view of a method according to an embodiment.

Turning to FIG. 7 an example of a method 200 for providing a packaging material 100 is schematically illustrated. The method 200 comprises a first step 202 of providing a core layer 161 with at least one weakening portion 150, and a second step 204 of providing a first set of crease lines 130a at a first area 110 intended to form a first package 10, and a second set of crease lines 130b at a second area 120 intended to form a second and adjacent package 10. The method 200 also comprises a third step 206 of laminating an inside laminate portion 180 to one side of the core layer 161, and laminating an outside laminate portion 170 to the opposite side of the core layer 161.

The second step may take place directly on the core layer before of after the first step.

Alternatively, the second step may take place after the third step, i.e. after the lamination operation. The lamination of the outside laminate portion to the core layer may take place before or after the second step of providing crease lines to the core layer, and it may be a separate lamination step from the lamination of the inside laminate portion to the core layer. The position alignment with the operations of the first and second steps are expected to be more difficult by a method where they are not done in near proximity and consecutive order, however.

At a separate step, performed at a later stage in a filling machine, the first area 110 is separated from the second area 120 by means of a transversal sealing area 140, such that the at least one weakened portion 150 is positioned at the transversal sealing area 140.

Step 202 may be performed by cutting or punching through the core layer 161, or e.g. by removing at least a part of the core layer 161 by means of a laser.

Advantageously, step 202 is performed such that the at least one weakening portion 150 is fully arranged within a cutting area 146 arranged between an upper sealing area 142 and a lower sealing area 144 of the transversal sealing area 140.

So far it has been described that a weakening portion 150 is provided as a local removal, thickness reduction or cut-through of at least parts of the core layer 161. It should however be realized that a weakening portion 150 may comprise several closely arranged weakening portion parts; for example, a weakening portion 150 may be formed by 3-7 slits arranged in close proximity to each other, such as a short perforation line.

From the description above follows that, although various embodiments of the invention have been described and shown, the invention is not restricted thereto, but may also be embodied in other ways within the scope of the subject-matter defined in the following claims.

The invention claimed is:

1. A web of packaging material to be formed into plural packages, the web of packaging material comprising a core layer and an inside laminate portion to be directed towards an inside of the packages formed from the packaging material and comprising a layer of a heat sealable thermoplastic polymer, said web of packaging material comprising a first area to form a first package of the plural packages, a second area to form a second and adjacent package of the plural packages, and a transversal sealing area-extending in a transversal direction across a width of the web, located between the first area and the second area, wherein the transversal sealing area comprises an upper transversal sealing area for accommodating an upper end seal of the first package, a lower transversal sealing area for accommodating a lower end seal of the second package, and a transversal cutting area arranged between the upper and lower transversal sealing areas, for accommodating a linear transversal cut along a center of an entire extension of the transversal cutting area when cutting off individual packages formed from the web of packaging material, and wherein the core layer is provided with at least one weakening portion at the transversal sealing area, the weakening portion of the core layer existing before formation of the upper end seal and the lower end seal.

2. The packaging material according to claim 1, wherein the at least one weakening portion comprises at least one cut-through of the core layer.

3. The packaging material according to claim 1, wherein the at least one weakening portion comprises a plurality of cut-throughs of the core layer.

4. The packaging material according to claim 1, wherein the at least one weakening portion is arranged at a lateral position, of the transversal sealing area, at which position the packaging material is intended to be folded.

5. The packaging material according to claim 1, wherein the first area is provided with crease lines to form the first package, and the second area is provided with crease lines to form the second and adjacent package.

6. The packaging material according to claim 5, wherein the at least one weakening portion is arranged at the transversal cutting area.

7. The packaging material according to claim 6, wherein the at least one weakening portion is fully arranged within the transversal cutting area.

8. The packaging material according to claim 6, wherein the at least one weakening portion extends in a direction substantially perpendicular to the transversal cutting area, wherein the length of the at least one weakening portion is more than 50% of the height of the cutting area.

9. The packaging material according to claim 1, wherein the core layer is provided with a plurality of weakening portions at the transversal sealing area.

10. The packaging material according to claim 1, wherein the core layer comprises a cellulose-based material, such as paper or paperboard.

11. The packaging material according to claim 1, further comprising an outside laminate portion.

12. A package formed by a packaging material according to claim 1.

13. The package according to claim 12, comprising a transversal lower end seal and a transversal top end seal, at least one of said end seals being formed by transversally folding the tube of packaging material and subsequent sealing, wherein the at least one weakening portion is positioned at an area of the fold of said tube.

14. A method for providing a web of packaging material, comprising:
providing a core layer with at least one weakening portion, and
the core layer including a first area intended to form a first package, and a second area-intended to form a second and adjacent package, and a transversal sealing area extending in a transversal direction across a width of the web, located between the first area and the second area, wherein the transversal sealing area comprises an upper transversal sealing area for accommodating an upper end seal of the first package, a lower transversal sealing area for accommodating a lower end seal of the second package, and a transversal cutting area arranged between the upper and lower transversal sealing areas, for accommodating a linear transversal cut along a center of an entire extension of the transversal cutting area when cutting off individual packages formed from the web of packaging material,
laminating an inside laminate portion to one side of the core layer, the inside laminate portion to be directed towards an inside of a package formed from the packaging material and comprising a layer of a heat sealable thermoplastic polymer, wherein
the at least one weakening portion of the core layer is positioned at the transversal sealing area of the core layer before the laminating of the inside laminate portion to the one side of the core layer.

15. The method according to claim 14, wherein the at least one weakening portion is provided by cutting or punching through the core layer.

16. The method according to claim 14, wherein the at least one weakening portion is provided by removing a part of the core layer by a laser.

17. The method according to claim 14, wherein the at least one weakening portion is fully arranged within the cutting area.

* * * * *